US005406880A

United States Patent [19]

Haller

[11] Patent Number: 5,406,880

[45] Date of Patent: Apr. 18, 1995

[54] HEAVY EQUIPMENT JACK

[75] Inventor: Graeme F. Haller, Queensland, Australia

[73] Assignee: Oildrive Pty. Ltd., Queensland, Australia

[21] Appl. No.: 161,834

[22] Filed: Dec. 3, 1993

[51] Int. Cl.[6] .......................... F01B 7/20; F16J 15/18

[52] U.S. Cl. .......................................... 92/52; 92/53; 92/167

[58] Field of Search .............................. 92/51, 52, 53; 91/167 R

[56] References Cited

U.S. PATENT DOCUMENTS

| | | | |
|---|---|---|---|
| 3,483,798 | 12/1969 | Parrett et al. | 92/52 |
| 4,726,281 | 2/1988 | De Filippi | 92/52 X |

FOREIGN PATENT DOCUMENTS

| | | | |
|---|---|---|---|
| 209497 | 7/1957 | Australia | 92/53 |
| 2129279 | 1/1973 | Germany | 92/52 |
| 0043206 | 3/1984 | Japan | 92/52 |
| 0739243 | 6/1980 | U.S.S.R. | 92/51 |
| 0939849 | 6/1982 | U.S.S.R. | 92/52 |

*Primary Examiner*—Edward K. Look
*Assistant Examiner*—Hoang Nguyen
*Attorney, Agent, or Firm*—Panitch Schwarze Jacobs & Nadel

[57] ABSTRACT

A double acting hydraulic jack comprising a housing from which at least two pistons extend, each of the pistons being telescopic with respect to one another and with respect to the housing, and a counterbalance valve between adjacent pistons. The counterbalance valve allows hydraulic fluid to flow from an outer piston to an inner piston during piston extension and prevents back flow of hydraulic fluid, thus eliminating piston retraction during extension under load.

4 Claims, 3 Drawing Sheets

HEAVY EQUIPMENT JACK

BACKGROUND OF THE INVENTION

This invention relates to a jack for lifting heavy equipment such as bulldozers, haul trucks, scrapers, and the like, where high lift of large tonnages is required. The invention also relates to a truck for positioning and transporting the jack.

Jacks presently available for high lift of large tonnages have a number of disadvantages. Jacks having a combination of large tonnage capacity and long stroke usually comprise telescopic cylinders stood vertically under the equipment to be lifted. Both double acting and single acting jacks are known. Single acting jacks require large external springs to retract the cylinder making the machine bulky while not being 100% reliable in retraction. Both the double acting and single acting units have a major disadvantage when used for lifting heavy loads. Depending on seal drag, occasionally the second stage of a two-stage jack extends first, lifting the machine off the ground, until the increased pressure overcomes the breakaway friction on the first stage seals. Once this occurs the pressure to move the first stage is much lower than on the second stage. This causes the second stage to drop as the hydraulic fluid behind the second stage piston is forced out and under the first stage piston. The first stage is extended by this fluid but not by the same distance as the retraction of the second stage. The result is usually a sudden drop of the load several inches. This is disconcerting to the operator of the jack and can be dangerous. A similar situation can occur when lowering the load.

Other shortcomings of existing heavy equipment jacks concern the means for transporting and positioning the jacks. When wheels are fitted, a mechanism is required to ensure that the wheels do not take the load when the jack extends in lifting heavy equipment. One design allows the jack to hinge on a spring loaded mechanism. In another design, movement of the jack into a vertical position is required to lift the wheels clear of the floor.

Other jacks have either a long frame (handle) which can be used to place the jack in position, or require the operator to go under the equipment to position the jack. Jacks having a long frame fitted usually have it positioned only about 600 mm above floor level so that the frame does not foul the equipment. Due to the weight of the jack, a great deal of effort is required to move it, sometimes more than one person being needed. Use of this amount of effort on a handle so close to the floor can cause back injuries.

SUMMARY OF THE INVENTION

It is an object of the invention to provide a jack for lifting heavy equipment in which the extendable elements of the jack cannot drop during extension under load.

It is a further object of the invention to provide a truck for a heavy equipment jack which allows easy positioning of the jack under equipment and easy transportation of the jack.

In a first aspect of the invention, there is provided a double acting hydraulic jack comprising a housing from which at least two pistons extend, each of said pistons being telescopic with respect to one another and with respect to the housing, and a counter balance valve between adjacent pistons, wherein the counter balance valve allows hydraulic fluid to pass from an outer piston into an inner piston to extend the inner piston relative to the outer piston and to restrict back flow of hydraulic fluid from the inner piston to the outer piston.

Typically, the jack comprises two pistons. Such pistons are also referred to in the art as stages, the first stage being the piston closest to the jack housing when the jack is extended with the second and subsequent stages being the pistons successively further from the jack housing when extended.

The pistons other than the innermost piston can have an external flange at the head end and an internal flange at the end opposite the head. The innermost piston can have an external flange at the end opposite the head of the piston. The flanges prevent separation of the pistons when fully extended and also provide surfaces on which the hydraulic fluid can bear, particularly during retraction.

Typically, seals are provided to prevent escape of hydraulic fluid. Advantageously, the seals are incorporated into the piston flanges.

As indicated above, the counter balance valve allows hydraulic fluid to flow from the outermost piston through to the innermost piston during extension of the pistons but restricts the back flow of hydraulic fluid. This prevents dropping of the pistons during extension under load.

Separate hydraulic fluid systems are provided for the double action of the jack. A first system, utilised in lifting mode, comprises an inlet and channels which allow hydraulic fluid to enter the jack housing and extend the pistons from the housing. A second system, utilised in lowering mode, similarly comprises an inlet and channels which allow hydraulic fluid to enter the jack housing and retract the pistons into the housing.

In lifting mode when hydraulic fluid is pumped into the first system, hydraulic fluid in the second system is passively exhausted from the jack. Similarly, in lowering mode when hydraulic fluid is pumped into the second system, hydraulic fluid in the first system is passively exhausted from the jack.

During piston retraction in lowering mode, hydraulic fluid can flow from the innermost piston to the outermost piston or pistons against the counter balance valve to allow exhaustion of hydraulic fluid from the first system. pilot passage from the second system which allows hydraulic fluid pumped into that system to open the counter balance valve so that fluid can flow from an inner piston to the adjacent outer piston.

Ports in the second system for passage of hydraulic fluid between pistons and the jack housing are positioned so that piston seals do not pass over the ports during extension and retraction. This allows the use of "soft seals" to provide a creep-free jack.

The hydraulic fluid is typically high pressure oil.

The jack can be constructed from any suitable material or combination of materials as is known in the art.

In a second aspect, the invention provides a truck for transportation and positioning of a heavy equipment jack, said truck comprising a chassis having a transverse axis about which said chassis can rotate, means for movement of said truck associated with said axis, members projecting away from said chassis to receive trunnions fixed to said jack such that the centre line of said trunnions runs parallel to said chassis axis, and a frame pivotally mounted to said chassis at the end opposite said projecting members and extending away from said chassis, there being provided means to adjustably fix the angle between said frame and said chassis, wherein said trunnion centre line is positioned relative to said axis so that downward movement of said handle rotates said chassis about said axis and raises said jack clear of the surface supporting said jack.

The means for movement of the truck can be tracks or slides or the like, or two or more wheels, pivotally mounted on the chassis axis. The means for movement can be mounted to the chassis axis by a suspension system. Advantageously, the suspension system comprises leaf springs. Typically, the means for movement of the truck is a pair of wheels centred on the chassis axis. Advantageously, the wheels have pneumatic tires fitted thereto.

The trunnions can also serve as rotary joints for the supply of hydraulic fluid to the jack or for the return of oil from the jack. A pump for supply of hydraulic fluid, and if necessary a fluid reservoir, can be mounted on the truck chassis. If rotary joints are used as trunnions and the pump and reservoir are rigidly fixed to the truck chassis, fluid connections between the pump, reservoir and rotary joints can be with rigid tubing. The preferred rigid tubing is steel tubing.

The frame is typically a single tube or channel extending obtusely away from the plane of the chassis. Alternatively, the frame can be a trapezoid shaped fabrication with at least two pivot points at the attachment of the frame to the chassis. One or more casters can be fitted to the lower surface of the frame distal to the chassis so that when downward pressure is applied to the handle, the caster or casters contact the surface bearing the truck. This facilitates moving the truck as the dragging of the frame on the surface is prevented.

The frame can have a handle associated therewith distal the pivot end. The handle can be a T-bar or cross bar mounted to a member or members projecting from the frame. The handle height can be adjusted to a height comfortable to the operator or appropriate to the job conditions by varying the angle between the frame and the chassis. Advantageously, the means for adjusting the angle between the frame and the chassis is a turnbuckle, fixed at one end to the frame and at the other end to the chassis. The means for adjusting the angle between the frame and the chassis can also be an hydraulic cylinder.

Advantageously, controls for the pump are mounted to the frame, typically adjacent the handle, to regulate lifting and lowering of the load with the jack. A connector for air supply to drive the pump can also be provided on the frame distal to the truck chassis.

The frame can have a towing hitch associated therewith at the end distal the chassis. This permits mechanised transportation and positioning of the truck/jack unit.

Advantageously, the truck chassis is configured so that the distance along the transverse axis between the extremes of the means for movement of the truck is substantially the same as the maximum transverse dimension of the jack fitted to the truck. This is effected by providing a connecting member between the trunnion end of the chassis and the portion to which ancillary equipment is mounted wherein the means for movement of the truck is associated with the connecting member.

The truck can be constructed from any suitable material or combination of materials. Typically, the truck is fabricated from steel and/or aluminium.

BRIEF DESCRIPTION OF THE DRAWINGS

A preferred embodiment of the invention will now be described with reference to the accompanying drawings in which.

DESCRIPTION OF THE PREFERRED EMBODIMENT

Figure 1:
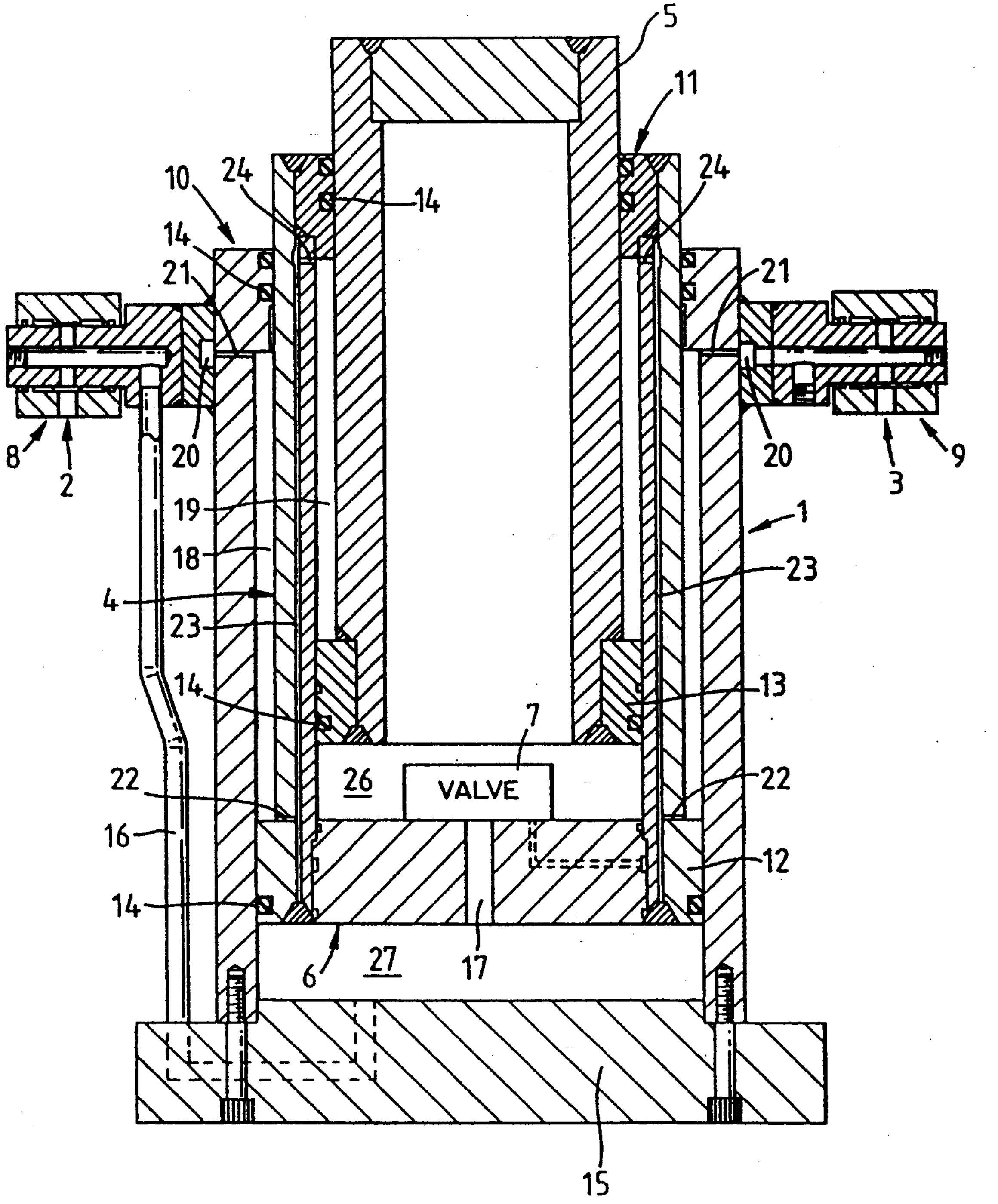
FIG. 1 is a cross-sectional view of a two stage double-acting jack wherein the cross-section is through the centre line of the hydraulic fluid inlets.

Referring now to FIG. 1, there is shown a jack comprising a housing (1) and inlet (2) for a first hydraulic fluid system, an inlet (3) for a second hydraulic fluid system, and pistons (4) and (5) comprising first and second stages of the jack respectively. The head (6) of first stage piston (4) has incorporated therein a counter balance valve (7). The inlets (2) and (3) are through rotary joints (8) and (9) respectively which constitute trunnions. The jack housing (1) and first stage piston (4) have internal flanges (10) and (11) respectively while the first and second stage pistons have external flanges (12) and (13) respectively. Seals (14) are fitted into the flanges. To facilitate assembly of the jack, the base (15) of the jack housing (1) is demountable and the flanges (10) to (13) can be fabricated separately.

In lift mode, hydraulic fluid is pumped into the first system through inlet (2) and flows into the jack through pipe (16). Fluid pressure against head (6) extends first stage piston (4) from the jack housing (1). Fluid can also flow through channel (17) to extend second stage piston (5). Back flow of fluid through channel (17) in lift mode is prevented by counterbalance valve (7). Fluid in cavities (18) and (19) is expelled through inlet (3) via channels (20) to (24).

In lowering mode, fluid is pumped into the second system via inlet (3). Fluid flows into channel (20) which encircles the jack body (1) then through multiple ports (21) into cavity (18). Fluid pressure on flange (12) retracts first stage piston (4) into jack body (1). Fluid can also flow from cavity (18) through multiple ports (22) into channels (23) then through multiple ports (24) into cavity (19) where fluid pressure on flange (13) retracts second stage piston (5). In lowering mode, fluid is also directed from channel (23) through pilot passage (25) to open counterbalance valve (7). Fluid pumped into cavity (26) during lifting can then pass through passage (17) to cavity (27) to be expelled through inlet (2).

Figure 2:
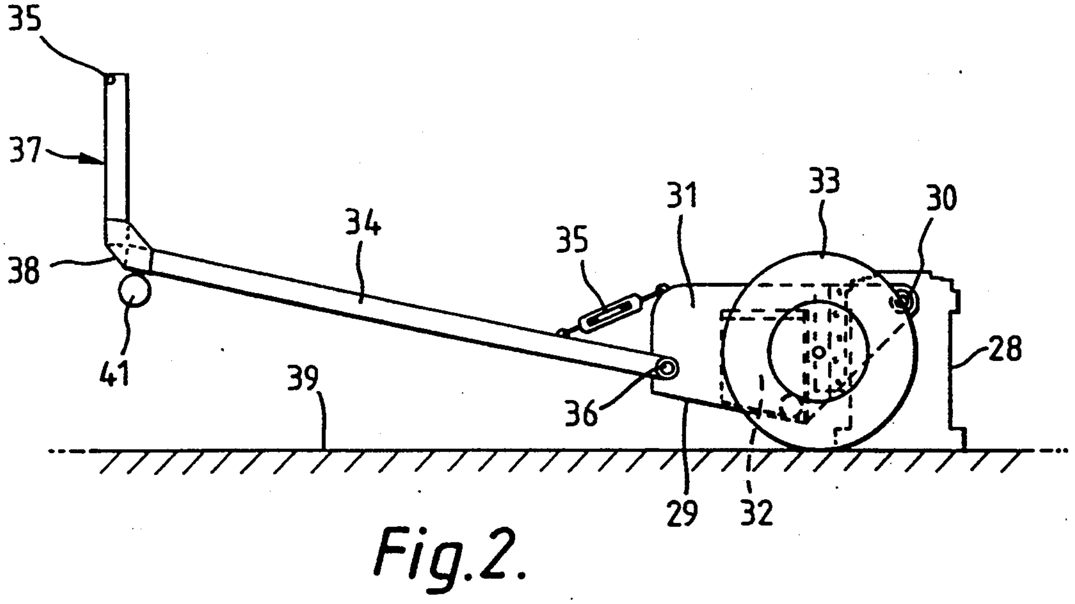
FIG. 2 is a side view of a heavy equipment jack fitted to a truck with high pressure oil pump and oil reservoir wherein the jack is in the jacking position.
Figure 3:
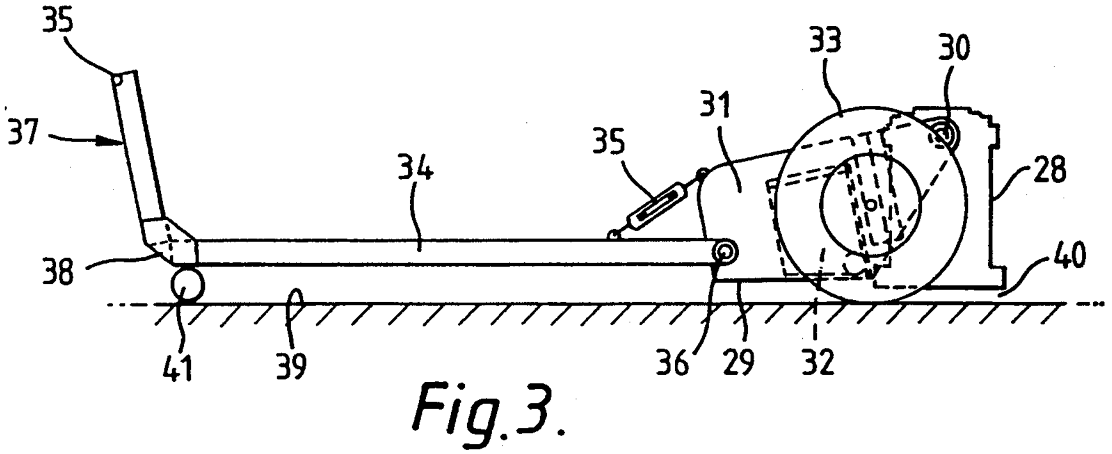
FIG. 3 is the same view as in FIG. 2 but with the jack in the transport position.

Referring now to FIGS. 2 and 3, there is shown the jack of the invention (28) fitted to truck chassis (29) via trunnions (30) on opposite sides of the jack (rotary joints (8) and (9) of FIG. 1). Also mounted on the truck are a high pressure oil pump (31) and oil reservoir (32) for the supply of hydraulic fluid to the jack (28). The high pressure oil pump (31) and oil reservoir (32) are connected to the jack (28) with rigid steel tubes, not shown in the figure, via the rotary joints comprising trunnions (30). The truck is supported by pneumatically tired wheels (33) on either side of the truck. A frame (34) extends to a T-bar handle (35) from a pivot (36) on the truck chassis. The angle between the frame (34) and the chassis of the truck (29) is set by turnbuckle (35). A castor (41) is fixed to the underside of the frame (34). Controls (37) are mounted to the frame close to the handle to regulate the pump (31) for extension or retraction of the jack (28). An air connection (38) for driving the pump is also provided in the frame (34).

The jack (28) positioned for use is shown in FIG. 2. The jack adopts an orientation perpendicular to the supporting surface (39) through being able to pivot on the trunnions (30) as the truck chassis (29) rotates around the axles of wheels (33) during lowering of the jack from transport position.

The jack in transport position is shown in FIG. 3. Downward movement of the handle (35) rotates the truck chassis around the axles of wheels (33) and raises the jack (28) above the surface (39) as indicated at (40). Pivoting of the jack (28) on trunnions (30) moves the base of the jack towards the centre line of wheels (33). Castor (41) can contact the surface (39) to prevent frame (34) dragging on the surface during transportation of the jack with the truck.

Figure 4:
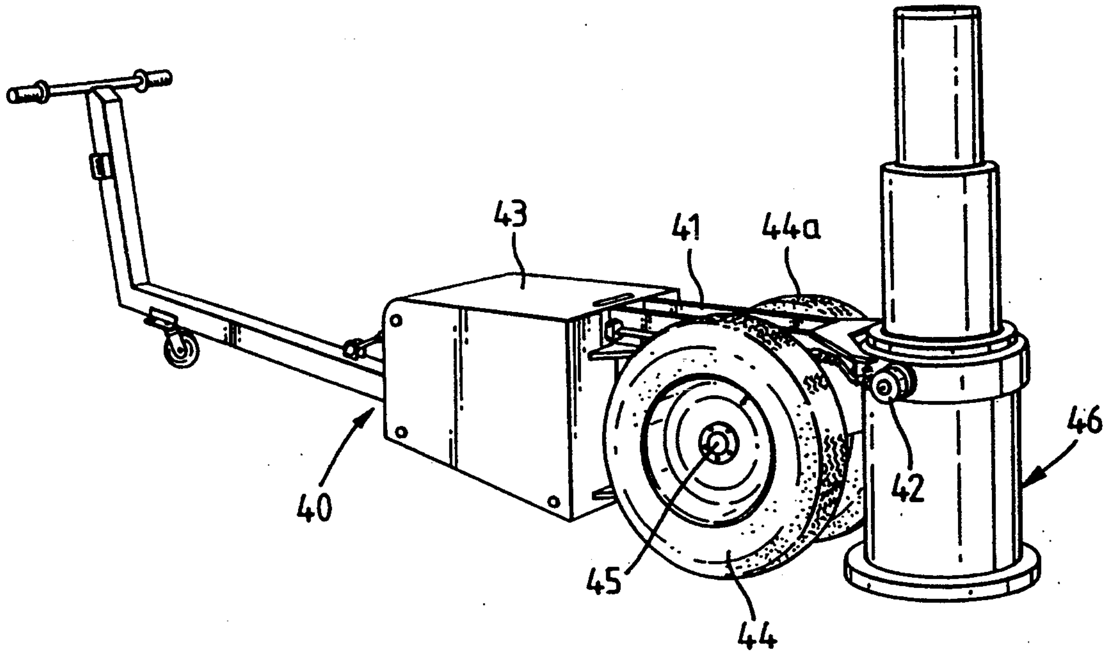
FIG. 4 is a perspective view of a heavy equipment jack fitted to an alternative form of the truck, wherein the pistons of the jack are extended.

FIG. 4 shows an alternative form of a truck according to the invention wherein chassis 40 has a connecting member 41 between the trunnions, one of which is shown at 42, and the portion 43 of the chassis which can hold a fluid pump and reservoir (not shown). The means for movement of the truck, in this case pneumatically tired wheels 44 and 44*a*, is associated with connecting member 41. In this form of the truck, the distance along chassis axis 45 between the extremes of the means for movement of the truck is substantially the same as the maximum diameter of jack 46.

Whilst the above has been given as an illustrative example of the invention, many modifications are variations can be made thereto by persons skilled in the art without departing from the broad scope and ambit of the invention as set forth below in the claims.

The hydraulic jack of the invention finds use for the lifting of heavy machinery such as bulldozers, haul trucks, scrapers and other equipment used in mining, earth moving and the like. The novel features incorporated into the pistons of the jack results in uniform lifting and lowering of the jack load which enhances operator safety.

Use of a heavy equipment jack in conjunction with the truck allows transport and positioning of the jack with less operator effort compared with other heavy equipment jacks and contributes further to operator safety. The trunnions used for mounting the jack on the truck make the Jack easier to move as the weight swings towards the centre line of the truck wheels when the jack is raised, thereby reducing the effort required to hold the jack off the supporting surface. Furthermore, the jack generally hangs vertically so that when lowered into position the jack will sit flat on the supporting surface with no weight from the load on the truck wheels.

The use of rotary joints for fluid connection with solid tubing when the pump and fluid reservoir are mounted on the truck obviates the use of flexible tubing. This increases the safety of the jack/truck unit.

I claim:

1. A double acting hydraulic jack comprising a housing from which at least two pistons extend, each of the pistons being telescopic with respect to one another and with respect to the housing;

a counter balance valve between adjacent pistons;

a first hydraulic fluid system comprising a first inlet and first channel which allow hydraulic fluid to be pumped into the housing and extend the pistons from the housing; and a second hydraulic fluid system comprising a second inlet and second channel which allow hydraulic fluid to be pumped into the housing to retract the pistons into the housing;

wherein the counter balance valve allows hydraulic fluid pumped into the first hydraulic fluid system to pass from an outer piston into an inner piston to extend the inner piston relative to the outer piston and to restrict back flow of hydraulic fluid from the inner piston to the outer piston during piston extension, and wherein a pilot passage is provided from the second hydraulic fluid system for allowing hydraulic fluid pumped into the second hydraulic fluid system to open the counter balance valve so that fluid in the first hydraulic fluid system flows from the inner piston to the outer piston during piston retraction.

2. A double acting hydraulic jack according to claim 1 comprising two pistons.

3. A double acting hydraulic jack according to claim 1 wherein the piston other than the innermost piston has an external flange at its head end and an internal flange at its opposite end, and the innermost piston has an external flange at the end opposite its head end; said flanges preventing separation of the pistons when fully extended and providing surfaces on which the hydraulic fluid bears.

4. The double acting hydraulic jack according to claim 1 wherein the first and second inlets comprise rotary joints.

* * * * *